Dec. 23, 1958        O. L. CULBERSON ET AL        2,865,713
                    MANUFACTURE OF PHOSPHORIC ACID
Filed Dec. 23, 1954                               3 Sheets-Sheet 1

INVENTORS
ORAN L. CULBERSON
WILLIAM A. PARDEE
BY

ATTORNEY:

Fig. 1-A

United States Patent Office 2,865,713
Patented Dec. 23, 1958

2,865,713

MANUFACTURE OF PHOSPHORIC ACID

Oran L. Culberson, Corpus Christi, Tex., and William A. Pardee, Fox Chapel, Pa., assignors to Gulf Research & Development Company, Pittsburgh, Pa., a corporation of Delaware Application December 23, 1954, Serial No. 477,304

9 Claims. (Cl. 23—165)

This invention relates to manufacture of phosphoric acid, and more particularly to a process wherein high grade crushed phosphate rock, with or without the addition of coke, is introduced into a rotary kiln, is heated therein to a temperature of approximately 1850° F. or somewhat thereunder, is coated with liquid petroleum asphalt during its passage through the said kiln, the said asphalt being applied to the phosphate rock at a multiplicity of spaced points, and the asphalt is coked into and onto the phosphate rock during the heating, thus forming an intimately combined and highly reactive aggregate of phosphate rock and coke, the said highly reactive aggregate is introduced at a high temperature into a blast furnace in the absence of added silica or other fluxing medium, is smelted in the blast furnace with a hot blast at a temperature of approximately 2300° F., the blast furnace gases are burned to oxidize the smelted out phosphorus to phosphorus pentaoxide, the pentaoxide is hydrated to phosphoric acid, and the phosphoric acid is finally separated from accompanying gases.

The manufacture of phosphoric acid from phosphate rock and metallurgical coke in a blast furnace has been practiced in past years but silica or other fluxing material has always been required and the process has always required excessively high temperature, with the consequence that the coke consumption has been so high as to render the blast furnace operation uneconomical. This has forced the complete abandonment of phosphate blast furnace operation in the United States notwithstanding that this operation would otherwise be particularly adaptable to large deposits of high grade phosphate rock in portions of the United States that do not have large scale and low cost electric power available for the conduct of electric furnace smelting operations.

In the past, all blast furnace smelting of phosphate rock has necessarily required temperatures of close to 3000° F., even though fluxing material was used, and this, together with the production of a molten slag, has required very high coke consumption, often running to and even above three pounds of coke per pound of phosphorus available in the rock charged.

In the present invention we prepare an aggregate of phosphate rock and carbon in which the phosphate rock is thoroughly coated with, and to a substantial degree impregnated with, the carbon, the two being in extremely intimate and uniform contact and the coke being in a form with a previously unattained extent of pore surface area per gram of coke. As a consequence of the intimate contact of phosphate rock and carbon, and of the high pore surface area per unit weight of coke, the reducing reaction between the carbon and the phosphate rock is greatly facilitated and can be effected at temperatures within the approximate range of 2000° F. to 2400° F., which is from 400° to 800° F. below that which has previously been possible. The preparation of a highly reactive aggregate of phosphate rock and carbon is effected by introducing the phosphate rock in relatively finely divided form into a heated rotary kiln in which it is heated and then coated and impregnated with an asphalt which will flow at the kiln temperature, by continuing the heating of the mixture of the phosphate rock and asphalt (this mixture being sometimes referred to herein as material-in-process) to a point at which the asphalt is at least partially coked, by adding further asphalt to the material-in-process at a number of successive points during its progress through the rotary kiln and so spacing the points of asphalt introduction as to permit at least partial coking of each charge of asphalt prior to the introduction of the next such charge, the degree of coking between successive charges of asphalt being to a stage at which the material-in-process will not adhere to the walls of the kiln to such a degree as to prevent its further longitudinal travel therein. The aggregate prepared in the manner just described is discharged from the rotary kiln at a temperature of about 1850° F.

In the practice of this invention we prepare an intermediate product in the form of a novel aggregate of phosphate rock and carbon, this novel aggregate being susceptible of reduction in a blast furnace for production of phosphorus at temperatures of the order of 2000° F. to 2400° F. as compared with temperatures of 2800° to more than 3000° in the prior art. Phosphate rock has certain adsorptive capacity and it has a surface which makes a good bond with the asphalt. When carbonized, the bond of rock and carbon is so perfect that there is no tendency whatever for separation. It is particularly effective, convenient and economical to produce our aggregate in a horizontal rotary kiln, wherein the material-in-process can be tumbled and mixed and directly heated simultaneously, with alternate incremental addition of asphalt and coking thereof.

We ordinarily find it desirable to prepare an aggregate containing an amount of carbon at least 0.8 times the weight of the phosphorus, figured as $P_2O_5$, in the phosphate rock, the precise proportions depending on the prospective heat requirements and losses in subsequent processing, and we find that the aggregate containing such an amount of carbon is best prepared by adding and carbonizing the asphalt in a series of increments, each increment proportioned to add anywhere from about three percent to ten percent of carbon to the phosphate rock. These increments are advantageously proportioned with the lower percentages at the cooler end of the horizontal rotary kiln and the higher percentages at the hotter end of the kiln. Also, the spacing of the points at which successive increments are introduced is advantageously somewhat greater at the cooler end of the kiln than at the hotter end of the kiln because partially cooled gases require more time, and therefore more kiln length, to accomplish the carbonization than do the hotter gases at the furnace end of the kiln. Advantageously the successive increments of asphalt are made as great as possible, and the maximum amount to be introduced at any point is such as will carbonize on the rock in the rotary kiln without forming a sticky mass therein which would adhere to the walls of the kiln and tend to stay there rather than travel longitudinally therein.

The asphalt used in this process may vary over a wide range in characteristics but a relatively high fixed carbon content is preferred. Relatively low melting asphaltic material is ordinarily characterized by relatively low fixed carbon, and it ordinarily requires considerably more heating in the kiln to carbonize it than is the case with a high fixed carbon asphalt. High melting point petroleum asphalts, characterized by high fixed carbon content, are especially advantageous material for building up the large proportion of carbon required for reducing phosphate rock. The preferred asphalt for this purpose is one which will flow through the charging lines to the most remote nozzle in the kiln without coking in the charging line, that will be liquid enough when it comes in contact with the phosphate rock to thoroughly wet the rock and become bound thereto and absorbed thereinto, and that will nevertheless be promptly carbonized. Petroleum asphalts having fixed carbon content of from 35 to 55 percent will in most cases have these desirable qualities. We have successfully used vacuum tower residuums of Baxterville (Mississippi) crude, vacuum tower bottoms from the distillation of mixed West Texas crude, and lighter asphalts. The Baxterville residuums ranged from a 33 percent residue with 37.5 percent carbon residue and 267° F. softening point (ASTM Method D36), to an 18 percent residue with 55 percent carbon residue and 440° F. softening point. The West Texas vacuum tower bottoms had a 17 percent carbon residue and a softening point of 88° F. When using asphalts with softening points of 200° F. and above it is practiced to introduce the first portion of the asphalt into the kiln with the phosphate rock as discrete solid material.

The aggregate, while still hot, is charged to the top of a blast furnace. No fluxing material is incorporated in the aggregate or otherwise charged into the blast furnace. We do not use a self-fluxing phosphate rock. The blast furnace used is a typical blast furnace such as is used in the smelting of iron ore except that it is designed for a process which produces discrete solid residual material rather than molten slag. It is therefore provided with a pit at the bottom and an Archimedian screw or other means for removing the residual material from the base of the furnace. The furnace is built with the usual shaft, bosh, tuyeres, bell, downcomer, etc. A hot blast from conventional stoves is introduced through the tuyeres. The off-gas first passes through dust precipitating and removal means and is thereupon used as fuel for heating one or more stoves, as may be required. The burning of the off-gas in the stoves of course requires the introduction of some oxygen at this point, commonly in the form of air, and the phosphorus content of the gas is consequently oxidized to phosphorus pentaoxide. Burned gases from the stove or stoves are passed through a precooler which is maintained at a temperature above the condensing temperature of phosphorus pentaoxide and is then introduced into a hydrator where the phosphorus pentaoxide is converted to phosphoric acid. The remainder of the gas, usually carrying considerable phosphoric acid mist leaves the hydrator and finally passes through an electrostatic precipitator wherein phosphoric acid mist is precipitated. The stripped gases are then discharged from the system and the precipitated phosphoric acid from the electrostatic precipitator is advantageously recirculated back to the hydrator and there used as a condensing and absorbing medium. The discharge product, phosphoric acid, is removed from the base of the hydrator.

Phosphorus pentaoxide would precipitate as a solid at a temperature slightly below 500° F. and therefore the cooling fluid in the gas precooler is kept above that temperature.

The outstanding novel features of this invention are the preparation of an aggregate of phosphate rock and carbon characterized by vastly greater pore surface area per unit of weight than has ever been used before, the reduction of the phosphate rock at temperatures in the neighborhood of 2300° F., possible only with an aggregate of the character herein described, and the attainment of a substantially higher recovery of phosphorus than has been attained in prior blast furnace operations. The temperature of approximately 2300° F. in the reducing furnace is approximately 500 to 700 Fahrenheit degrees lower than has been known to the prior art. It permits reduction of the phosphate rock at a temperature which does not melt the other constituents of the phosphate rock and which permits the removal of such material as a residue from the blast furnace in the form of discrete solid material. We have found that the reduction of the phosphate rock in the form of an aggregate such as herein described and at the temperature herein specified can be accomplished with high grade and medium grade phosphate rock without the reduction of the iron oxide content of the rock and without any measurable production of ferrophosphorus. The elimination of ferrophosphorus as a product makes about seven percent more of the phosphorus available for conversion into phosphoric acid, and the discrete solid residue from our process carries away about eight percent less of the phosphorus than is common in conventional blast furnace reduction of phosphate rock. These reduced losses result in increasing the yield of phosphoric acid by as much as 15%.

Referring to the accompanying drawings

Figure 1a is an elevation view of the phosphorus blast furnace, the stoves, and the oxidizing, hydrating, and acid separation apparatus.

Figures 1, 2, 3, 4:
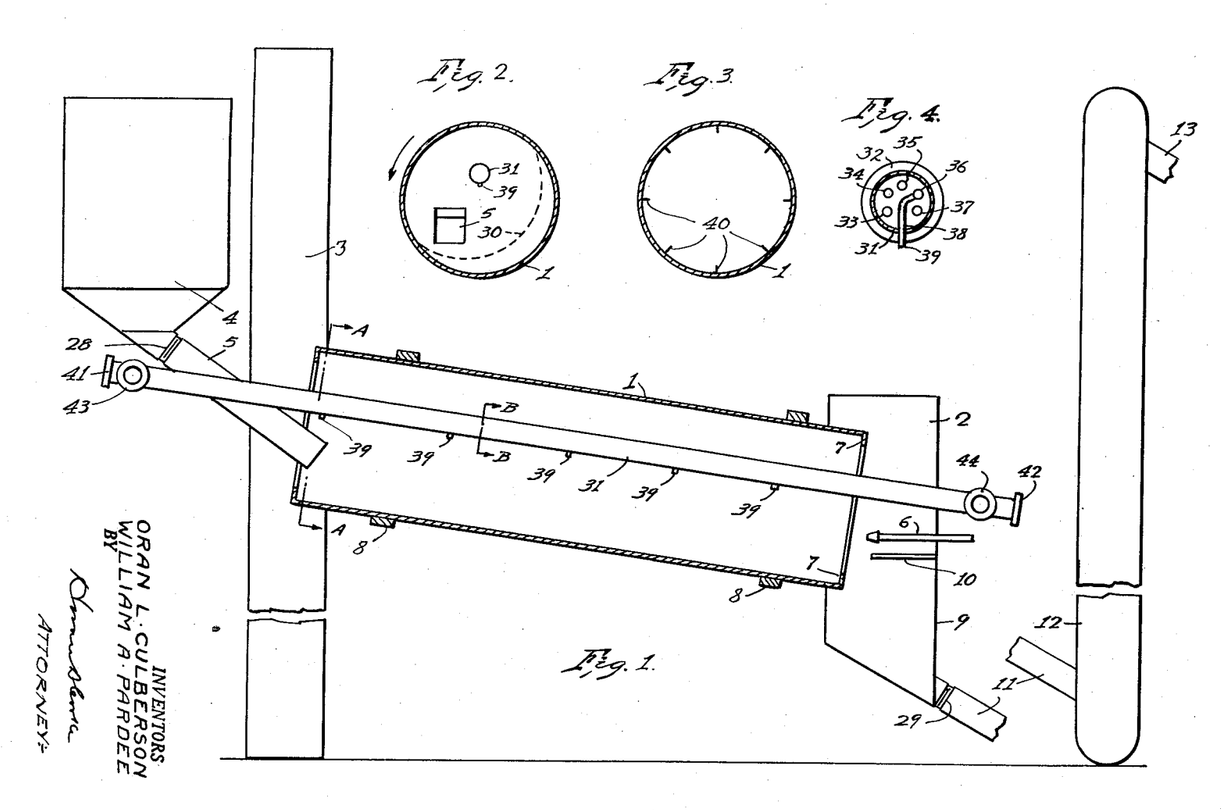
Figure 1 is a cross section view of the rotary kiln and its related parts.
Figure 2 is a cross section view taken on A—A of Figure 1.
Figure 3 is a cross section view of the rotary kiln, showing a convenient style of longitudinal bars or "lifters" therein.
Figure 4 is a cross section view of element 31 and related parts, taken on B—B of Figure 1.
Figure 1:
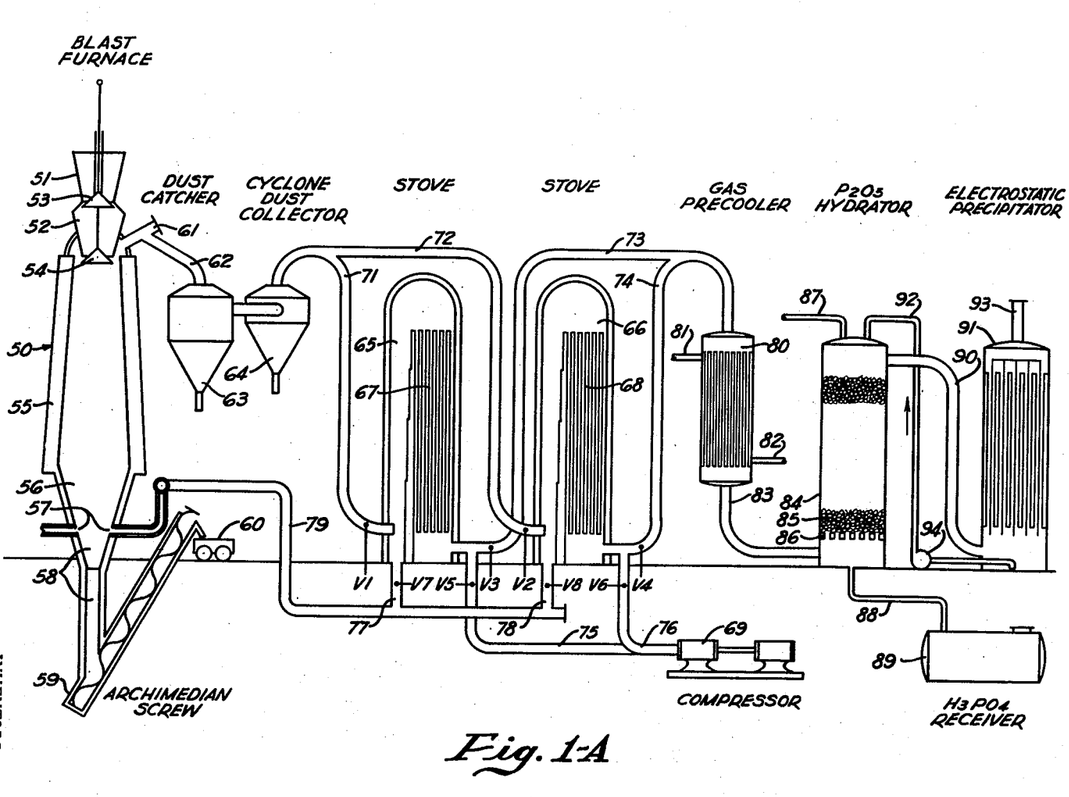

Referring to Figure 1, numeral 1 indicates an inclined rotary kiln conventionally referred to as a horizontal rotary kiln, extending from furnace chamber 2 at its lower end to stack 3 at its upper end. A raw material bin for material to be processed is indicated by numeral 4 and a chute 5 extends from the base of bin 4 into the upper (charging) end of kiln 1. Flow of material from bin 4 to kiln 1 is controlled by gate 28. The kiln is heated by burner 6, this burner being set back in furnace chamber 2 so that its flame will not ignite asphalt introduced, as hereinafter described, at the nearest nozzle 39. The kiln 1 discharges processed material at its lower end into receiving bin 9, which is separated from furnace chamber 2 by wall 10. A chute 11 extends from the base of receiving bin 9 to the base of elevator 12, and a gate 29 is provided to control the flow of material from bin 9 to elevator 12.

A jacketed conduit 31 extends through the entire length of horizontal rotary kiln 1, with its respective ends extending through and out beyond stack 3 and furnace chamber 2. It may be supported by the walls of these members 3 and 2 or by separate supports. Conduit 31 is fitted with a series of spray nozzles 39 and it carries in its interior a number of separate smaller conduits, 34 to 37 inclusive (subsequently described in connection with Figure 4), which extend from the individual spray nozzles to headers 41 and 42. Conduit 31 is also fitted with flanges 43 and 44 adjacent its respective ends to permit the introduction and circulation of steam or some other temperature controlling fluid in conduit 31, around the exterior of the aforementioned smaller conduits.

Referring to Figure 1a, hot aggregate from bin 9 is discharged by means of an elevator 12 and chute 13 (see Figure 1) into the charging bell of blast furnace 50. The charging bell comprises receiving hopper 51, lower hopper 52, upper bell 53 and lower bell 54. Blast furnace 50 comprises shaft 55, bosh 56, tuyeres 57, and pit 58. An Archimedian screw 59 is provided at the base of pit 58 for conveying discrete solid material to a disposal means such as lorry 60. An offtake 61 and downcomer 62 conduct the gases to dust catcher 63 and thence to cyclone dust collector 64. Numerals 65 and 66 indicate conventional stoves containing checker work 67 and 68. Conduits 71 and 72 are provided to conduct gas from the cyclone dust collector 64 to stoves 65 and 66, and conduits 73 and 74 are provided to conduct burned gases from stoves 65 and 66 to gas precooler 80. A compressor 69 is provided to supply air blast for the furnace tuyeres 57, and this compressor may be of either rotary or reciprocating type. Conduits 75 and 76 conduct the air from compressor 69 to stoves 65 and 66 respectively, and conduits 77 and 78 conduct the hot blast from the stoves through conduit 79 to tuyeres 57. Conduits 71 to 78 inclusive are provided with valves at the positions indicated by numerals V1 to V8 respectively. Gas precooler 80 has inlet and outlet connections 81 and 82 for cooling fluid. Conduit 83 conducts precooled gas to hydrator 84. Hydrator 84 may advantageously be a shell, as shown, containing packing material 85 supported by grating 86. Only the top portion and the bottom portion of the packing are shown in hydrator 84, but the intermediate portion of the hydrator is similarly packed. Conduit 87 supplies water to hydrator 84 and conduit 88 conducts phosphoric acid from the base of hydrator 84 to receiving tank 89. Conduit 90 conducts gas from the top of hydrator 84 to the entrance of electrostatic precipitator 91. Conduit 92 carries precipitated phosphoric acid from electrostatic precipitator 91 into the top of hydrator 84 with the aid of pump 94. Outlet 93 provides for the discharge of stripped tail gases from electrostatic precipitator 91.

Referring to Figure 2, this is a cross section taken on section line A—A of Figure 1. Figure 2 shows the discharge end of chute 5 and it shows jacketed conduit 31. Conduit 31 is positioned with its longitudinal axis parallel to the longitudinal axis of horizontal rotary kiln 1, and its axis will be at a point high enough to spray liquid asphalt onto the contents of the kiln from nozzle 39. The longitudinal axis of jacketed line 31 may be positioned somewhat to the side of the vertical axis of the kiln 1 in order to avoid having the material-in-process fall upon it during rotation of the kiln. Numeral 30 identifies a dotted line depicting the approximate surface of the discrete material-in-process while the kiln is rotating in a contra-clockwise direction.

Figure 3 is a cross sectional view of kiln 1 showing the interior thereof fitted with a series of longitudinal ledges or "lifters" 40 to increase the agitation of discrete material-in-process during its progress through the kiln. These have some advantages in the hotter end of the kiln.

Figure 4 is a cross section of jacketed conduit 31, taken on section line B—B of Figure 1. In this view, numeral 31 indicates the metallic conduit and 32 indicates a heavy jacket of insulating material which entirely surrounds conduit 31. Numerals 33, 34, 35, 36, and 37 indicate a series of smaller separate conduits inside of conduit 31 which lead to individual spray nozzles 39 and which terminate at their other end at header 41 or 42, at which point they are connected to individual supply lines, not shown. The number of these smaller conduits is determined by the needs of the process as hereinafter discussed. Each of the conduits of the series 33 to 37 inclusive is connected to a spray nozzle 39 through a connection 38. Figure 4 shows the manner of the connection from smaller conduit 36 to its nozzle 39.

Figure 5:
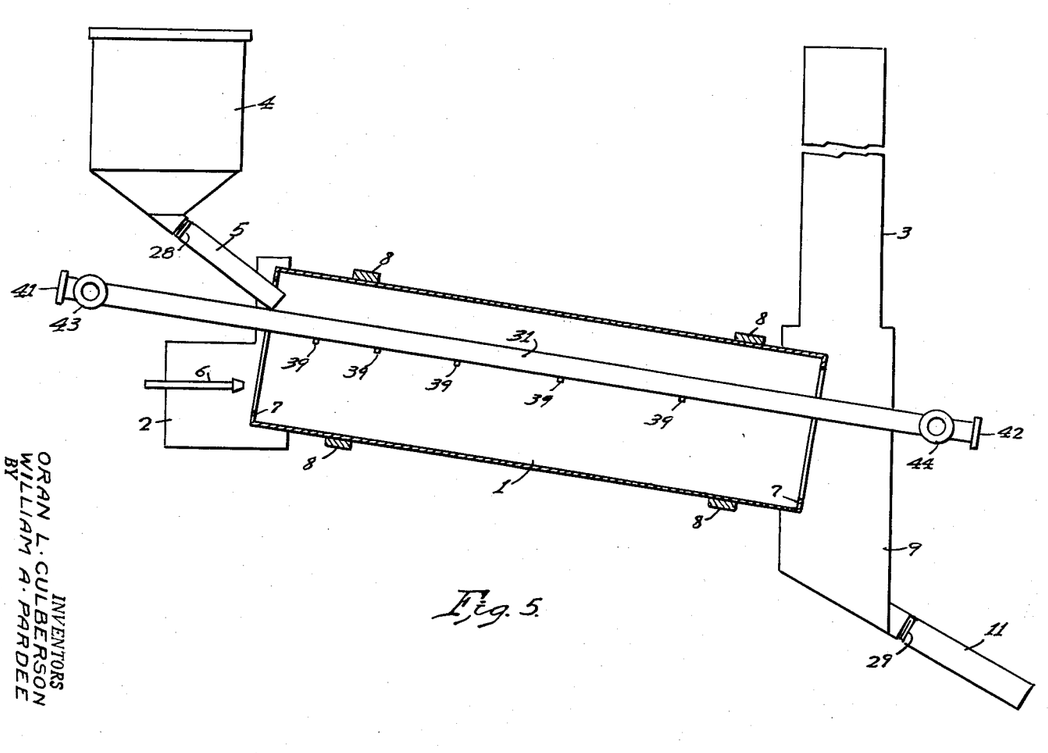
Figure 5 shows a modified form of the rotary kiln and associated parts.

Figure 5 is generally similar to Figure 1, except that furnace chamber 2 is at the upper (charging) end of kiln 1, and the stack connection is at the lower (discharge) end of kiln 1. Burner 6 is of course in furnace chamber 2 at the upper (charging) end of kiln 1. Kiln 1 and conduit 31 and their appurtenant parts, bins 4 and 9, chutes 5 and 11, and gates 28 and 29, are all identical with those parts as shown in Figure 1. However, the nozzles 39 on conduit 31 are spaced closer together at the charging end of the kiln in Figure 5, rather than at the discharge end of the kiln as in Figure 1. This is because the spacing of the nozzles depends on the temperature gradient of the combustion gases in the kiln, these being spaced closer together at the end of the kiln adjacent the furnace.

In the practice of this invention bin 4 is loaded with phosphate rock of approximately half inch and less in size. There is advantage in having the material fairly fine. Kiln 1, rotated by means of gears 8, is put in operation. Burner 6 is ignited to provide the necessary heat for the operation. Phosphate rock from bin 4 is passed through chute 5 into horizontal rotary kiln 1. A gate 28 or star-valve or other device of similar function is positioned to control the flow of phosphate rock from bin 4 into kiln 1.

When the operation is well established and conditions have attained equilibrium the material being processed will discharge over flange 7 of kiln 1 into bin 9 at a temperature of approximately 1850°. The phosphate rock entering kiln 1 from bin 4 may be at atmospheric temperature or it may be at a somewhat elevated temperature.

Asphalt to be sprayed on the phosphate rock during its passage through the kiln is charged through conduits 33, 34, 35, 36 and 37, all encased in conduit 31. This conduit 31 is exposed to the high temperature gases in kiln 1 and to prevent overheating and possible coking of the asphalt in conduits 33 to 37 inclusive two separate means of protection are provided. The first is heavy fireproof insulation 32 of minimum heat conductivity. The second is a continuous flow of steam or other temperature controlling fluid through the conduit 31. Flanges 43 and 44 are provided to receive and discharge the temperature controlling fluid. This temperature controlling fluid may be introduced at either end or it may with some advantage be conducted in a closed pipe inside conduit 31 to a point part way through the length of conduit 31 and discharged therefrom to both ends 43 and 44.

A smaller line, which need not be insulated, may be extended through the length of kiln 1 in a manner similar to conduit 31 to provide secondary air for combustion of the matter volatilized from the asphalt in kiln 1. This should have discharge openings through the wall of conduit 31 and insulation 32 at approximate points. In the situations wherein a stream of air is found to suffice as the temperature controlling means circulated in conduit 31 through flanges 43 and 44, we may use conduit 31 as the means of introducing secondary air, and have orifices in conduit 31 and insulation 32 to discharge such air into the kiln at the proper locations.

It is desirable to be able to positively control the amount of asphalt introduced at each point of introduction, wherefore a separate pipe of the group 33 to 37 inclusive is provided for each spray nozzle 39. The separate pipes connect to either header 41 or header 42 and are there connected to lines from asphalt pumps. A separate line from a separate pump to each individual nozzle 39 permits volumetric control of the asphalt introduced at each nozzle 39 and also serves to reduce possibility of coking a portion of a line or coking a nozzle 39 as would occur much more readily if several nozzles were served by a single line and the asphalt were free to flow out through the channel of least resistance. To minimize the heating of asphalt in conduits 33 to 37 inclusive by the hot gases in the kiln it is advantageous to extend some of these lines inward from header 41 and some from header 42 according to the relative proximity to those headers of the individual terminal nozzle 39 and the severity of the heat in the section of the kiln that the conduit must pass through.

While the accompanying drawings show five asphalt charging conduits, 33 to 37 inclusive, it is not necessary that there be that specific number. The actual number in any particular installation may be greater or in some special cases somewhat less, according to the kiln temperature and carbonizing characteristics of the asphalt. The actual number of points of introduction of asphalt along the length of the kiln should be sufficient to permit the individual increments of asphalt to be so limited in quantity that each individual increment will be promptly absorbed into the material-in-process and rapidly coked, thereby preventing the formation of a large sticky mass that would adhere to the walls of the kiln.

The minimum amount of carbon required in an aggregate is that amount which will react with all of the combined oxygen of the ore to reduce the same. We have found that the required minimum of carbon to reduce the ore is an amount within the range of from 45 pounds of carbon up to 60 pounds of carbon per hundred pounds of oxygen in the dry ore. In the case of aggregates of phosphate rock and carbon, the total carbon is computed not on all the oxygen in all the oxides present in the ore, but rather on the basis of the oxygen in those oxides that will be reduced. The amount of asphalt that must be introduced to produce a certain amount of carbon in the aggregate is susceptible of ready calculation from the fixed carbon content of the particular asphalt used. In the preparation of the aggregate in the kiln it may be necessary to use somewhat more asphalt than that required to produce the above amount of carbon, this additional amount going to provide for three other sources of carbon consumption, viz.: burn-off of carbon in the kiln if excess air is present; burn-off of carbon in handling hot briquettes from kiln to subsequent processing apparatus; and burn-off in the final processing (e. g. chlorination) if air or oxygen is introduced at that stage to maintain the temperature of reaction or for other purposes. The magnitude of these three demands for carbon is determined exclusively by conditions of operation, which are within the control of the operator, and this additional carbon should be provided according to need.

In a kiln having countercurrent flow of combustion gases and material-in-process, an appropriate spacing of five nozzles in a kiln 1 having a length of sixty feet is as follows. The first nozzle is positioned 5 feet from the charging end of the kiln, the second nozzle at 20 feet, the third nozzle at 33 feet, the fourth nozzle at 44 feet, and the fifth nozzle at 53 feet from the charging end, thus leaving seven feet at the hot end of the kiln to complete the carbonization.

In a kiln which operates with the gases leaving the kiln and entering the stack 3 at from 600° F. to 800° F., the maximum percentage of asphalt that can ordinarily be introduced at the cooler end of the kiln is such as will add about three and one-half percent to seven and one-half percent of carbon to the phosphate rock, measured after the asphalt is coked by the heat in the kiln. With a temperature in excess of 2000° F. for the furnace gases entering the kiln at the hot end, the maximum percentage of asphalt that can ordinarily be introduced from one nozzle close to that end is such as will add anywhere from about five percent to ten percent of carbon to the phosphate rock. Quantities of asphalt intermediate the foregoing figures are introduced at the intermediate nozzles. The introduction at the individual nozzles of lesser quantities of asphalt than those just stated is unobjectionable except that such practice may require a greater number of nozzles and even additional length of kiln. The introduction of asphalt at one point in greater quantity than can be promptly coked will produce a sticky mass that will not move longitudinally through the kiln and will seriously interfere with the operation.

We prefer to use as asphaltic material heavy petroleum residues characterized by fixed carbon content of 35% to 55%. Asphalts of even higher fixed carbon are desirable when such heavy asphalts can be used without choking up lines 33 to 37 inclusive.

In Figure 2 we have shown the conduit 31 with the nozzle 39 pointing directly downward. In some cases it may be more advantageous to rotate the conduit 31 counter-clockwise about 45° from the position shown, the actual position being chosen to put the spray of asphalt on the phosphate rock and to keep it away from the shell of kiln 1.

The combustion gases from the burner 6, together with distilled-off volatile matter, pass out of the upper end of the kiln into stack 3 and discharge to the atmosphere.

The material prepared in kiln 1 is finally discharged over the flange 7 at the lower end of the kiln into receiving bin 9, this bin being separated from furnace chamber 2 by means of wall 10. At this stage this material is aptly termed aggregate. From bin 9 the aggregate flows down chute 11 to the base of elevator 12, the passage of aggregate from bin 9 to elevator 12 being controlled by gate 29.

The foregoing description of our process covers an operation in which only phosphate rock and asphalt are charged to kiln 1. However, our process is not so limited and we may charge some coke with the phosphate rock, thus reducing the amount of asphalt required. When coke is charged with the phosphate rock it is broken down to the same size as the phosphate rock or smaller: the smaller it is, the better the result, with finely divided coke preferred. In any case, whether or not coke is charged with the phosphate rock the asphalt used in preparing an aggregate must be of a character, and sufficient in quantity, to penetrate into the pores of the ore and thereby produce an aggregate in which the carbon is intimately bound to and into the ore.

Up to this point the description of our process is directed to an operation in which the flow of the material-in-process and the flow of the combustion gases is countercurrent. However, the process can, with equal effectiveness and advantage, be operated with the material-in-process and the combustion gases flowing in the same direction. The necessary apparatus for this type of operation is shown in Figure 5 and has already been described. When, as in Figure 5, the furnace is positioned at the elevated end of the kiln and the material-in-process and the combustion gases flow in the same direction, it is possible to get the phosphate rock to a substantially elevated temperature in very short travel and to then apply the asphalt to the phosphate rock at a temperature conducive to prompt saturation and coking. In this manner of operation there is substantially less chance of forming a sticky mass that will adhere to the wall of the kiln and temporarily fail to move horizontally lengthwise thereof.

In a kiln having parallel flow of combustion gases and material-in-process, an appropriate spacing of five nozzles 39 in a kiln 1 having a length of sixty feet is as follows. The first nozzle is positioned 6 feet from the charging end of the kiln, the second nozzle 12 feet, the third nozzle 21 feet, the fourth nozzle 32 feet, and the fifth nozzle 45 feet from the charging end, thus leaving 15 feet for completion of the carbonization of the asphalt.

The aggregate made with phosphate rock and asphalt, as described, is uncommonly reactive and has a greater surface area, measured in square meters per gram, than is attainable with other known combinations of phosphate rock and carbon. It is preferable that added coke, if any, be of minor proportion in relation to that formed from asphalt in kiln 1.

The hot aggregate, after having been crushed if necessary, is elevated by elevator 12 or a skip-hoist or other equivalent means, and is discharged through chute 13 into charging hopper 51 whence it goes into hopper 52 and blast furnace 50 past bells 53 and 54. The temperature of the aggregate entering the blast furnace 50 should be as high as can be practiced without arriving at the threshold temperature for reduction of the phosphate rock. In transporting the hot aggregate from the discharge end of kiln 1 to blast furnace 50 it is important that the material be exposed to air only to the minimum possible extent in order to minimize the burning-off of carbon from the aggregate.

The blast furnace charge does not include silica or any other fluxing medium except insofar as such material may enter into the composition of the phosphate rock. It is definitely desired to restrict the presence of fluxing agents in the phosphate rock to a minimum and therefore we employ relatively high quality phosphate rock, preferably of approximately the following character, these figures being given on a dry basis.

| | |
|---|---|
| $P_2O_5$ | 28% or more. |
| $CaO$ | 40% or more. |
| $SiO_2$ | 15% or less. |
| $Al_2O_3$ | 5% or less. |
| $Fe_2O_3$ | Not over three and one-half percent. |

The above figures are strictly an approximation. The important thing is not some sharply defined analysis, but rather the absence of susbtantial self-fluxing characteristics in the phosphate rock at the operating temperature.

The blast furnace can be started up by building an initial fire of wood and coke, with low blast, and gradually increasing the coke charge until the bosh is pretty well filled, and then charging the shaft with the aggregate which has already been described. The burden will gradually be brought up to operating temperature while the blast is controlled to produce a maximum temperature of approximately 2300° F. to 2400° F. As the process gets under way the phosphorus content of the ore will be reduced to phosphorus and it will pass in vaporous form with the furnace gas into offtake 61 and downcomer 62. Furnace gases will ordinarily contain a considerable amount of dust and a large part of that will be precipitated in dust catcher 63, and most of the remainder of the dust will be precipitated in cyclone dust collector 64. Thoroughness in removing the dust in elements 63 and 64 will minimize operating difficulties in the stoves and will greatly improve the quality of the acid product.

An outstanding feature of this invention is the fact that no liquid slag is produced. Residue from the charged material gradually settles down into pit 58 below bosh 56, and this residue is dry friable material. It is removed from the bottom of pit 58 by means of an Archimedian screw 59 or equivalent means and discharged into lorry 60 or some equivalent means for removal. A star valve or similar device may be installed in the narrower portion of pit 58, if desired, as an extra precaution against the possibility of the dry residue in pit 58 blowing out through Archimedian screw 59.

Furnace gas leaving cyclone dust collector 64 goes either to stove 65 or to stove 66 through conduit 71 or 72, to be burned therein, while the other stove, previously heated, is being used to heat the air blast. The accompanying drawings, for simplicity of representation, show only two stoves 65 and 66. The actual number of stoves required may be greater than two, and in such case this will be a mere matter of duplication as one half of the total number of stoves will always be in use to burn the blast furnace gas while the other half is used to heat the air blast. The operation will be described as though there were simply two stoves 65 and 66, as shown in the accompanying drawing. Each stove is fitted with bridge wall and checker work indicated in stoves 65 and 66 respectively by numerals 67 and 68. Conduits 71 and 72 are controlled by valves at the locations indicated by numerals V1 and V2. If the furnace gases are burned in stove 65 the combustion gases from that stove will leave by conduit 73: if the furnace gases are burned in stove 66, the combustion gases will leave that furnace by conduit 74. These conduits 73 and 74 have valves at the locations indicated by numerals V3 and V4 respectively.

When stove 65 is used for burning the blast furnace gas, stove 66 is used simultaneously to heat the air blast, and the valves are set as follows: Valves V1, V3, V6 and V8 are open, while valves V2, V4, V5 and V7 are closed. When stove 66 is used for burning the blast furnace gas, stove 65 is used simultaneously to heat the air blast, and the valves are set as follows: Valves V2, V4, V5 and V7 are open, while valves V1, V3, V6 and V8 are closed.

A supply of air to tuyeres 57 is provided by compressor 69 which may be of either rotary or reciprocating type. The air discharge by this compressor goes either through conduit 76 to be heated by the hot checker work 68 in stove 66 or it goes through conduit 75 to be heated by hot checker work 67 in stove 65. Conduits 75 and 76 are controlled by valves at the locations indicated by numerals V5 and V6. When the air blast is being heated in stove 65, the heated air leaves that stove through conduit 77 controlled by valve V7. When the air blast is being heated in stove 66, the heated air leaves through conduit 78, controlled by valve V8. Conduits 77 and 78 discharge into conduit 79 which conducts the hot blast to the tuyeres 57.

The combustion of blast furnace gas in stoves 65 and 66 will of course require the introduction of air where conduits 71 and 72 enter the stoves. This introduction of air must be accomplished by means that will not permit the escape of air from the stoves when they are being used to heat the air blast and this is satisfactorily done by conducting air through valved lines to the points where conduits 71 and 72 deliver blast furnace gas to the stoves. This air may be supplied either by a separate blower or by tapping into conduits 75 and 76 or into either one of them. In the interest of simplification and clarity of the drawings these air connections are not shown in Figure 1a.

The combustion of the furnace gases in the stove results in oxidation of the phosphorus content of the furnace gas, so the reduced phosphorus in the combustion gases leaving the stoves through conduits 73 and 74 is in the form of phosphorus pentaoxide vapor. The combustion gases are at relatively high temperature when they leave the stove and it is desirable to cool them somewhat before they are processed further. However, phosphorus pentaoxide sublimes at a temperature slightly under 500° F. at atmospheric pressure and therefore the temperature of the gas is reduced only to a temperature somewhat above 500° F. prior to further processing. For this purpose we pass the gas through a precooler 80 which has connections 81 and 82 for introduction and removal of the cooling medium.

The phosphorus pentaoxide in the gas is hydrated to phosphoric acid in hydrator 84. This hydrator 84 can advantageously be in the form of a shell with a horizontal grating 86 a short distance above the bottom. The shell is then filled with cobble stones, Raschig rings, or other packing 85. The cooled gas from preheater 80 is conducted by means of conduit 83 into hydrator 84 at a point below grating 86, and the gas rises up through the packed hydrator and leaves it near the top through conduit 90. The gases rising in hydrator 84 are hydrated primarily by a stream of water which enters the top of hydrator 84 through conduit 87 and flows down over packing 85, countercurrent to the ascending gases. The gases leaving hydrator 84 contain much mist and are conducted by conduit 90 into an electrostatic precipitator 91 which removes substantially all of the phosphoric acid from the gas. The phosphoric acid precipitated in precipitator 91 is picked up by pump 94 and delivered through conduit 92 into the top of hydrator 84, to flow downward therein, countercurrent to the ascending gases. By proper control of the water stream entering the hydrator through conduit 87 it is possible to produce commerical strength phosphoric acid. This acid flows from the base of hydrator 84 through conduit 88 into phosphoric acid receiving tank 89.

A substantial pressure differential is of course necessary to effect the flow of the gas from the blast furnace through the dust collectors, stoves, precooler, hydrator and electrostatic precipitator. This flow can be effected by maintaining a sufficient superatmospheric pressure in the blast furnace—a pressure of the order of 25 pounds to 35 pounds per square inch, or more. There is however a substantial advantage to be gained by placing a blower in line 83 between gas precooler 80 and hydrator 84, thus boosting the pressure at that point. The use of a booster blower at this point will permit operation of the blast furnace under a superatmospheric pressure of approximately ten pounds and greatly simplify the furnace design and operation.

It has been stated that the aggregate produced in kiln 1 and subsequently subjected to further processing is characterized by a higher degree of porosity and a greater pore surface area than has previously been known to the art, and that this greater porosity appears to be the reason that we are able to attain results in the reduction of phosphate rock that have not previously been possible. Specific pore surface areas have been measured and are given in the specific examples which appear later herein. These pore surface areas have been determined by the well known B. E. T. method, developed by Brunauer, Emmett, and Teller and first published in the Journal of the American Chemical Society, Volume 60, at page 309 (1938). This method was subsequently published in A Treatise on Physical Chemistry edited by Hugh S. Taylor and Samuel Glasstone, and published in 1951 by D. Van Nostrand Company, New York: see volume II, pages 602 et seq. The pore surface areas given in this application for patent were determined with use of nitrogen gas.

Three specific examples of our operation are subsequently herein set forth in detail. The same phosphate rock was used in all three instances and an analysis of this rock will be found in specific Example I. Some of this rock was calcined at 1650° F. and a measurement was made of the pore surface area thereof. The pore surface area was 0. An aggregate made with this rock according to our present invention, as described in specific Example I, had a pore surface area of 42 square meters per gram. However, this same aggregate was ignited at 1600° F. and the carbon-free residue had a pore surface area of 0 square meters per gram.

In view of the fact that the phosphate rock had 0 pore surface area, the 42 square meters per gram of aggregate means 42 square meters of pore surface area in the 0.179 gram of that aggregate that consisted of asphalt carbonized in kiln 1. Multiplying the 42 square meters by 1.000/0.179 indicates a pore surface area of 235 square meters per gram of the so-carbonized asphalt.

Our specific Example II describes an aggregate produced from phosphate rock, added carbon, and carbonized asphalt. This aggregate had a pore surface area of 23.8 square meters per gram. By the same method of computation as that just used, the mixture of added coke and carbonized asphalt in the aggregate of specific Example II had a pore surface area of 133 square meters per gram. This figure is lower than that for the aggregate of specific Example I, but that is to be expected as the carbon of the aggregate of specific Example I is 100% carbonized asphalt formed in the kiln, while the carbon of specific Example II is 40% added coke and only 60% carbonized asphalt formed in the kiln.

No determination of pore surface area was made on the aggregate of specific Example III.

Following are three specific examples of the conduct and results of our process:

I. In this operation the raw material was phosphate rock of the following analysis:

| | Percent |
|---|---|
| $Al_2O_3$ | 2.28 |
| $P_2O_5$ | 31.06 |
| $Fe_2O_3$ | 1.62 |
| F | 1.92 |
| $TiO_2$ | .56 |
| $SiO_2$ | 6.67 |
| $ZrO_2$ | 6.82 |
| CaO | 49.00 |

A horizontal rotary kiln such as hereinbefore described was charged with 3000 pounds per hour of the above described phosphate rock, and through conduits 33 to 37 inclusive and nozzles 39 with 1100 pounds per hour of a 17% residue of Baxterville (Mississippi) crude oil, the 17% residue having the following tests:

| | |
|---|---|
| Solid gravity, 77°/77° F | 1.153 |
| Softening point (ASTM D36) ° F | 441 |
| Sulfur, wt. percent | 5.53 |
| Carbon residue | 55.2 |
| Proximate analysis: | |
|    Volatile matter percent | 50.9 |
|    Fixed carbon do | 49 |
|    Ash do | 0.11 |
|    V p. p. m | 186 |
|    Ni p. p. m | 84 |
|    Cu p. p. m | 2 |
|    Fe p. p. m | 375 |

The carbon content of the 1100 pounds of asphalt was 537 pounds. The burn-off in the kiln was about 3% and there were 521 pounds of carbon in the aggregate fed to the blast furnace each hour. This amount was provided on the basis of 0.55 pound of carbon for each of 675 pounds of oxygen in the portions of the ore which would be reduced, plus an additional 150 pounds of carbon per hour for burn-off in the blast furnace.

The aggregate was prepared in a horizontal rotary kiln having a length of sixty feet and a diameter of six feet. The phosphate rock was heated therein without asphalt in the first five feet of travel, and at five feet from the entrance it received its first spray of liquid asphalt. Four additional sprays of asphalt were charged to the material-in-process, these sprays being positioned at distances of twenty feet, thirty-three feet, forty-four feet, and fifty-three feet from the charging end of the kiln, the last of those points being seven feet from the discharge end of the kiln. The asphalt penetrated and was tightly bound to the phosphate rock and, with a furnace temperature of 2100° F. and with gases leaving the kiln at a temperature of approximately 700° F., each increment of asphalt was well carbonized before the addition of the next increment. The residence time of the material in the kiln was forty-five minutes. The aggregate had a pore surface area by the B. E. T. method of 42 square meters per gram of aggregate.

The aggregate left the kiln at a temperature of 1830° F. and had a temperature approximately 100° lower when it was charged into the blast furnace. With the aid of a hot blast the temperature in the blast furnace was maintained within 30° above or below 2300° F. It was possible to maintain even operation of the blast furnace, once an equilibrium was established, and a residue in the form of discrete solid material moved to the bottom of the bosh and was removed therefrom. The residue analyzed as follows:

| | Percent |
|---|---|
| $Al_2O_3$ | 6.50 |
| $P_2O_5$ | 0.81 |
| $Fe_2O_3$ | 5.71 |
| $TiO_2$ | 0.97 |
| $SiO_2$ | 14.10 |
| $ZrO_2$ | 6.62 |
| CaO | 65.28 |

The hot blast to the furnace ranged from 1500° F. to 1700° F. The heat for raising the temperature to 2300° F. in the blast furnace and for providing the heat necessary to maintain the endothermic reducing reaction came from combustion of part of the carbon of the aggregate. Prior blast furnace operations on phosphate rock have used from two to three times as much carbon as was used in our operations. A number of factors contribute to our low consumption of carbon. The first reason is that due to the uncommonly high reactivity of the carbon in our aggregate it is not necessary to have such a high excess of carbon present as in the prior art. Another is the fact that no silica or other slagging agent is added to the charge. Another is the fact that we do not have to provide heat of fusion for a large mass of slag. Another is the lower total heat loss by radiation and otherwise that results from our unprecedentedly low temperature of operation. The low radiation loss also reflects advanced engineering design.

The burned gaseous effluent from the blast furnace, containing oxidized phosphorus in the form of phosphorus pentaoxide vapor, was cooled to a temperature of approximately 550° F. and then passed upward through a packed chamber countercurrent to a descending stream of water and recirculated acid which hydrated the $P_2O_5$ content of the gas and produced orthophosphoric acid. The gas in this particular operation was intimately contacted in hydrator 84 with descending streams from lines 87 and 92 and the phosphoric acid content of the discharged tail gas was substantially nil. Of the phosphorus content of the phosphate rock charged to the blast furnace, our average recovery as phosphoric acid was in excess of 90%.

II. Our second specific example is as follows: Phosphate rock of the same analysis as that used in specific Example I was charged to a horizontal rotary kiln at the rate of three thousand pounds per hour. Also charged each hour was 215 pounds of dry coke and 930 pounds of asphalt of the same analysis as that used in specific Example I. The ore and asphalt were heated in the kiln as hereinbefore described and the resultant aggregate when charged into the blast furnace had a total carbon content of 656 pounds of carbon. This carbon charge, after allowing 0.75 pound of carbon per pound of oxygen in the portions of the ore that would be reduced, provided an additional 150 pounds for burn-off by the blast in the blast furnace. The aggregate charged to the blast furnace had a pore surface area of 23.8 square meters per gram. Its performance in the blast furnace was somewhat less satisfactory than aggregates with carbon content derived solely from asphalt charged into the rotary kiln, but it nevertheless performed much better than conventional blast furnace charge. Specifically, this aggregate required a temperature of approximately 2400° F. in the blast furnace, which is still 400° to 600° lower than required in conventional operation. At this blast furnace temperature the rate of reduction of the phosphate rock was substantially the same as that experienced in the operations of specific examples I and III and as in conventional phosphate rock blast furnace operations of the prior art.

III. A third specific example of the conduct and results of our process is the following:

The entire operation was conducted in a manner similar to that described in extenso as the first of these three specific examples, except that the asphalt used was a 33.4% vacuum still residuum from Baxterville (Mississippi) crude oil and had the following tests:

| | |
|---|---|
| Specific gravity, solid 77° F./77° F. | 1,083 |
| Softening point (ASTM D36) °F | 267 |
| Sulfur percent | 4.61 |
| Carbon residue do | 37.5 |
| Fixed carbon do | 34.0 |

The charge of phosphate rock to the kiln was 3000 pounds per hour and the charge of the above described asphalt was 1580 pounds per hour, which deposited substantially the same amount of carbon on and in the phosphate rock as in the case of the 49% fixed carbon Baxterville pitch previously described. The character of the resulting aggregate and its performance in the blast furnace were in all respects substantially the same as when using the heavier pitch described in the first of these specific examples.

In this specification and the appended claims the term "horizontal rotary kiln" is used to designate the type of kiln commonly known by that designation, notwithstanding that such kilns are in fact inclined kilns having the charging end elevated somewhat above the discharge end.

We claim:
1. The process of manufacturing phosphoric acid which comprises: charging phosphate rock to a heated horizontal rotary kiln; rotating the kiln and thereby tumbling the phosphate rock and causing it to travel longitudinally through the said kiln; maintaining the temperature in the said kiln within a range that will carbonize asphalt; successively applying and carbonizing a plurality of small increments of asphalt with the said phosphate rock during its longitudinal passage through the said kiln; discharging from the kiln an aggregate of fully carbonized asphalt and phosphate rock; charging the said aggregate to a blast furance in the absence of added fluxing material; heating the said aggregate in the blast furnace to a temperature below 2400° F. and thereby freeing phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

2. The process of manufacturing phosphoric acid which comprises: charging phosphate rock to a heated horizontal rotary kiln; rotating the kiln and thereby tumbling the phosphate rock and causing it to travel longitudinally through the said kiln; maintaining the temperature in the said kiln within a range that will carbonize asphalt; successively applying and carbonizing a plurality of small increments of asphalt with the said phosphate rock, sufficient to saturate the rock therewith, during its longitudinal passage through the said kiln; discharging from the kiln an aggregate of fully carbonized asphalt and phosphate rock; charging the said aggregate to a blast furnace in the absence of added fluxing material; heating the said aggregate in the blast furnace to a temperature not exceeding 2400° F. and thereby freeing phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

3. The process of manufacturing phosphoric acid which comprises: charging phosphate rock characterized by the absence of substantial self-fluxing characteristics to a heated horizontal rotary kiln; rotating the kiln and thereby tumbling the phosphate rock and causing it to travel longitudinally through the said kiln; applying a small percentage of liquefied petroleum asphalt to the phosphate rock at a point near the charging end of the said kiln; maintaining the temperature in the said kiln within a range that will carbonize the applied asphalt; carbonizing the applied small percentage of asphalt; successively applying and carbonizing additional small percentages of asphalt with the said phosphate rock during its longitudinal passage through the said kiln; discharging from the kiln an aggregate of fully carbonized asphalt and phosphate rock; charging the said aggregate to a blast furnace in the absence of added fluxing material; heating the said aggregate in a blast furnace to a temperature within the approximate range of 2000° F. to somewhat below 2400° F. and thereby freeing phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

4. The process of manfacturing phosphoric acid which comprises: charging phosphate rock to a heated horizontal rotary kiln; rotating the kiln and thereby tumbling the phosphate rock and causing it to travel longitudinally through the said kiln; applying a small percentage of liquefied petroleum asphalt to the phosphate rock at a point near the charging end of the said kiln; maintaining the temperature in the said kiln within a range that will carbonize the applied asphalt; carbonizing the applied small percentage of asphalt; successively applying and carbonizing additional small percentages of asphalt with the said phosphate rock during its longitudinal passage through the said kiln until the weight of the carbonized asphalt is at least 0.45 times the weight of the oxygen to be removed from the ore; discharging from the kiln an aggregate of fully carbonized asphalt and phosphate rock; charging the said aggregate to a blast furnace in the absence of added fluxing material; heating the said aggregate in the blast furnace to a temperature below 2400° F. but high enough to free phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

5. The process of manufacturing phosphoric acid which comprises: charging phosphate rock to a heated horizontal rotary kiln; rotating the kiln and thereby tumbling the phosphate rock and causing it to travel longitudinally through the said kiln; applying a small percentage of liquefied petroleum asphalt to the phosphate rock at a point near the charging end of the said kiln; maintaining the temperature in the said kiln within a range that will carbonize the applied asphalt, while not heating the material-in-process above 1900° F.; carbonizing the applied small percentage of asphalt; successively applying and carbonizing additional small percentages of asphalt with the said phosphate rock during its longitudinal passage through the said kiln; discharging from the kiln an aggregate of fully carbonized asphalt and phosphate rock having a pore surface of at least 15 square meters per gram of aggregate; charging the said aggregate to a blast furnace in the absence of added fluxing material; heating the said aggregate in the blast furnace to a temperature below 2400° F. but high enough to free and thereby freeing phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

6. The process of manufacturing phosphoric acid which comprises: charging phosphate rock to a heated horizontal rotary kiln; rotating the kiln and thereby tumbling the phosphate rock and causing it to travel longitudinally through the said kiln; applying a small percentage of liquefied petroleum asphalt to the phosphate rock at a point near the charging end of the said kiln; maintaining the temperature in the said kiln within a range that will carbonize the applied asphalt, while not heating the material-in-process above 1900° F.; carbonizing the applied small percentage of asphalt; successively applying and carbonizing additional small percentages of asphalt with the said phosphate rock during its longitudinal passage through the said kiln until the weight of the carbonized asphalt is at least 0.45 times the weight of the oxygen to be removed from the ore; discharging from the kiln an aggregate of fully carbonzied asphalt and phosphate rock having a pore surface of at least 15 square meters per gram of aggregate; charging the said aggregate to a blast furnace in the absence of added fluxing material; heating the said aggregate in the blast furnace to a temperature not exceeding 2400° F. but high enough to free phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

7. The process of manufacturing phosphoric acid which comprises: charging to a heated horizontal rotary kiln a major portion of phosphate rock characterized by the absence of substantial self-fluxing characteristics and a minor portion of coke; rotating the kiln and thereby tumbling the phosphate rock and coke and so causing them to travel longitudinally through the said kiln; applying a small percentage of liquefied petroleum asphalt to the said major portion of phosphate rock and said minor portion of coke at a point near the charging end of said kiln; maintaining the temperature in the said kiln within a range that will carbonize the applied asphalt and thereby carbonizing the applied small percentage of asphalt; successively applying and carbonizing additional small percentages of asphalt with the said major portion of phosphate rock and said minor portion of coke during the longitudinal passage of the material-in-process through the said kiln; discharging from the kiln an aggregate of fully carbonized asphalt and coke and phosphate rock; charging the said aggregate to a blast furnace in the absence of added fluxing material; heating the said aggregate in the blast furnace to a temperature not exceeding 2400° F. but high enough to free phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

8. The process of manufacturing phosphoric acid which comprises: charging to a heated horizontal rotary kiln a major portion of phosphate rock and a minor portion of coke; rotating the kiln and thereby tumbling the phosphate rock and coke and so causing them to travel longitudinally through the said kiln; applying a small percentage of liquefied petroleum asphalt to the said major portion of phosphate rock and said minor portion of coke at a point near the charging end of said kiln; maintaining the temperature in the said kiln within a range that will carbonize the applied asphalt, and thereby carbonizing the applied small percentage of asphalt; successively applying and carbonizing additional small percentages of asphalt with the said major portion of phosphate rock and said minor portion of coke during the longitudinal passage of the material-in-process through the said kiln until the total of said minor portion of coke and the carbonized asphalt in the aggregate attain at least the proportion required for reduction of the phosphate rock; discharging from the kiln an aggregate of fully carbonized asphalt and coke and phosphate rock; charging the said aggregate to a blast furnace in the absence of added fluxing material; heating the said aggregate in the blast furnace to a temperature within the approximate range of 2000° F. to 2400° F. and thereby freeing phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

9. The process of manufacturing phosphoric acid which comprises: charging to a heated horizontal rotary kiln a major portion of phosphate rock and a minor portion of coke; rotating the kiln and thereby tumbling the phosphate rock and coke and so causing them to travel longitudinally through the said kiln; applying a small percentage of liquefied petroleum asphalt to the said major portion of phosphate rock and said minor portion of coke at a point near the charging end of said kiln; maintaining the temperature in the said kiln within a range that will carbonize the applied asphalt, and thereby carbonizing the applied small percentage of asphalt; successively applying and carbonizing additional small percentages of asphalt with the said major portion of phosphate rock and said minor portion of coke during the longitudinal passage of the material-in-process through the said kiln until the total weight of said minor portion of coke and the carbonized asphalt in the aggregate is at least 0.45 times the weight of the oxygen to be removed from the ore; discharging from the kiln an aggregate of fully carbonized asphalt and phosphate rock; charging the said aggregate to a blast furnace in the absence of added fluxing material; heating the said aggregate in the blast furnace to a temperature not exceeding approximately 2400° F. and thereby freeing phosphorus in vapor form from the phosphate rock; oxidizing the phosphorus vapors to phosphorus pentaoxide; hydrating the phosphorus pentaoxide to phosphoric acid; and separating the phosphoric acid from accompanying gases.

References Cited in the file of this patent

UNITED STATES PATENTS

| | | |
|---|---|---|
| 241,868 | Liebig | May 24, 1881 |
| 1,032,763 | Newberry et al. | July 16, 1912 |
| 1,129,722 | Peacock | Feb. 23, 1915 |
| 1,777,582 | Seyfried | Oct. 7, 1930 |
| 1,861,236 | Morgan | May 31, 1932 |
| 1,896,006 | Memminger | Jan. 31, 1933 |
| 1,925,510 | Walton | Sept. 5, 1933 |
| 2,075,212 | Levermore et al. | Mar. 30, 1937 |

UNITED STATES PATENT OFFICE
CERTIFICATE OF CORRECTION nt No. 2,865,713

December 23, 1958

Oran L. Culberson et al.

It is hereby certified that error appears in the printed specification the above numbered patent requiring correction and that the said Letters ent should read as corrected below.

Column 15, lines 34 and 35, claim 5, strike out "and thereby freeing".

Signed and sealed this 31st day of March 1959.

(SEAL)

Attest:
KARL H. AXLINE
Attesting Officer

ROBERT C. WATSON
Commissioner of Patents